(12) United States Patent
Fischbuch et al.

(10) Patent No.: US 7,696,289 B2
(45) Date of Patent: Apr. 13, 2010

(54) LOW MOLECULAR WEIGHT INDUCED CONDENSING AGENTS

(75) Inventors: D. Brett Fischbuch, Kingwood, TX (US); Robert O. Hagerty, La Porte, TX (US); Sandy C. Hinds, Crosby, TX (US); Douglas R. Holroyd, Al-Jubail Industrial (SA); Ai Vey Ng, Singapore (SG); Diwaker Singh, Singapore (SG)

(73) Assignee: ExxonMobil Chemical Patents Inc., Houston, TX (US)

( * ) Notice: Subject to any disclaimer, the term of this patent is extended or adjusted under 35 U.S.C. 154(b) by 1006 days.

(21) Appl. No.: 11/433,682

(22) Filed: May 12, 2006

(65) Prior Publication Data

US 2007/0265400 A1    Nov. 15, 2007

(51) Int. Cl.
*C08F 2/34* (2006.01)
*C08F 6/00* (2006.01)
*C08F 210/08* (2006.01)

(52) U.S. Cl. .................... 526/68; 526/70; 526/901; 528/482

(58) Field of Classification Search .................... 526/68, 526/70, 901; 528/482
See application file for complete search history.

(56) References Cited

U.S. PATENT DOCUMENTS

| | | | |
|---|---|---|---|
| 4,543,399 A | 9/1985 | Jenkins, III et al. | |
| 4,588,790 A | 5/1986 | Jenkins, III et al. | |
| 5,028,670 A | 7/1991 | Chinh et al. | |
| 5,317,036 A | 5/1994 | Brady, III et al. | |
| 5,352,749 A | 10/1994 | DeChellis et al. | |
| 5,376,742 A | 12/1994 | Krause | |
| 5,405,922 A | 4/1995 | DeChellis et al. | |
| 5,436,304 A | 7/1995 | Griffin et al. | |
| 5,453,471 A | 9/1995 | Bernier et al. | |
| 5,462,999 A | 10/1995 | Griffin et al. | |
| 5,541,270 A | 7/1996 | Chinh et al. | |
| 5,616,661 A | 4/1997 | Eisinger et al. | |
| 5,668,228 A | 9/1997 | Chinh et al. | |
| 5,804,677 A | 9/1998 | Chinh et al. | |
| 5,969,061 A | 10/1999 | Wonders et al. | |
| 6,262,192 B1 | 7/2001 | Wu | |
| 6,384,157 B1 | 5/2002 | Cai et al. | |
| 6,391,985 B1* | 5/2002 | Goode et al. | 526/70 |
| 6,759,489 B1 | 7/2004 | Turkistani | |
| 2003/0027946 A1 | 2/2003 | Pon | |
| 2003/0153695 A1 | 8/2003 | Braganca et al. | |
| 2005/0182207 A1* | 8/2005 | Singh et al. | 526/68 |
| 2005/0267268 A1 | 12/2005 | Hendrickson | |
| 2005/0267269 A1 | 12/2005 | Hagerty et al. | |

FOREIGN PATENT DOCUMENTS

| | | |
|---|---|---|
| WO | WO 93/03093 | 2/1993 |
| WO | WO 94/25497 | 11/1994 |
| WO | WO 99/12982 | 3/1999 |
| WO | WO 03/011920 | 2/2003 |
| WO | WO 03/014169 | 2/2003 |

* cited by examiner

*Primary Examiner*—Fred M Teskin (57) ABSTRACT

The present invention relates to a continuous gas phase process comprising passing a recycle stream through a fluidized bed in a gas phase fluidized bed reactor, wherein the recycle stream comprises a low molecular weight dew point increasing component and a high molecular weight component, polymerizing an alpha-olefin monomer in the presence of a catalyst, and controlling an amount of the low molecular weight dew point increasing component in the recycle stream such that a dew point approach temperature of the recycle stream is less than the dew point approach temperature when operating with the higher molecular weight dew point increasing component alone.

44 Claims, 4 Drawing Sheets

LOW MOLECULAR WEIGHT INDUCED CONDENSING AGENTS

FIELD OF THE INVENTION

The present invention relates to a gas phase polymerization process operating with dew point lowering components in the cycle gas.

BACKGROUND OF THE INVENTION

Advances in polymerization and catalysts have resulted in the capability to produce many new polymers having improved physical and chemical properties useful in a wide variety of superior products and applications. With the development of new catalysts, the choice of polymerization-type (solution, slurry, high pressure or gas phase) for producing a particular polymer has been greatly expanded. Also, advances in polymerization technology have provided more efficient, highly productive and economically enhanced processes. Regardless of these technological advances in the polyolefin industry, common problems, as well as new challenges still exist. For example, the stable operation of a gas phase process at high production rates utilizing dew point increasing components remains a challenge, which can particularly be dependent on the polymer being produced, the catalyst system employed, and the particular dew point increasing component employed.

Unstable fluidization, agglomeration, fouling, sheeting and/or static generation in a continuous gas phase process, in, for example, the fluidized bed, heat exchangers, distributor plates, and probes, can lead to the ineffective operation of various reactor systems. In a typical continuous gas phase process, upward flowing cycle gas fluidizes a bed of resin particles. The cycle gas is removed from the top of the reaction vessel as a recycle stream, compressed and passed through a cooler, and returned back into the bottom of the reaction vessel. This recycle system is employed for many reasons, including the removal of heat generated in the process by the polymerization reaction. An interruption, diversion, or blockage of the flow of cycle gas through any part of the fluidized bed can result in significant operating problems.

It is well known that stable operation of fluidized bed reactors used in the production of polymers requires the avoidance of conditions that lead to sticky polymer or fusion of resin particles in the fluidized bed. Sticky, or cohesive polymer causes a range of problems in the gas phase reactor systems. For example, sticky polymer can reduce the quality of fluidization that occurs within the reactor, and can reduce the degree of internal mixing below the minimum levels required to disperse the catalyst and maintain stable temperature control. The most common result of excessive resin stickiness is the formation of small rounded agglomerates that accumulate above the plate and disturb fluidization. In addition, stickiness of the polymer can lead to the deposition of polymer product on the walls of the reactor expanded section, which often leads to the formation of dome sheets (solid masses of polymer material deposited on the walls of the "dome", or expanded section of the reactor). In many cases, these dome sheets are large and massive, containing as much as 1000 kg of agglomerated polymer. These dome sheets eventually fall from the dome and become lodged on the distributor plate, where they interfere with fluidization. In some cases, the dome sheets block the product discharge port, and force a reactor shutdown for cleaning. In more extreme cases, a large dome sheet can disrupt fluidization in a localized region above the plate and lead to formation of a chunk.

For these reasons it is desirable to have means of preventing excessive stickiness of the polymer product.

Polymer stickiness is thought to be a function of several process and product variables within the reactor. The relevant process variables include the reaction temperature and the concentrations (or partial pressures) of condensable components such as 1-butene and isopentane in the reactor gas phase. In general, stickiness of the polymer is promoted by higher reaction temperature and higher concentrations of condensable materials. Important product properties include the resin density, molecular weight (or melt index), and the molecular weight distribution (MWD). In general, stickiness of the polymer is promoted by lower resin density, lower molecular weight (higher melt index), and broader molecular weight distribution (Mw/Mn=MWD).

It is also well known that polymer leaving the gas phase reactor contains significant quantities of dissolved gases, including monomers, comonomers, and dew point increasing components. Furthermore, a quantity of reactor cycle gas is also entrained with the polymer leaving the reaction system. These dissolved and entrained gases are separated from the polymer in a polymer purging system. The entrained gases, dissolved gases, and other gases exiting the reaction system are recovered in vent recovery systems using methods of compression, chilling, and condensing.

Fluidized-bed reactors used to produce polyethylene resin are normally operated at a relatively high reaction temperature. For example, in the production of a typical low density film resin (0.917 g/cc density, 1 dg/min melt index) produced with metallocene or Ziegler-Natta catalyst, the reaction temperature is typically operated at 85° C. A relatively high reactor temperature provides for a relatively high temperature differential over the cooling water temperature (which typically operates at 25 to 35° C.). This, in conventional practice, is thought to provide for maximum heat removal capability for maximum production rates.

It would be desirable to have a polymer production process that is free of polymer agglomeration or stickiness. It would also be desirable to have a process that allows higher concentrations of condensable materials and/or higher dew point temperatures in the reactors for higher production rates. It is even further desirable to operate with a higher level of condensable components while improving the recovery of these condensable components from the purge vessel and other reactor vent streams.

Our findings indicate that when low molecular weight dew point condensing components are included in the reactor cycle gas, the previously determined maximum dew point of the cycle gas relative to the bed temperature had been unnecessarily limited due to concerns regarding polymer stickiness. We found that it is possible to operate with a dew point that is closer to the bed temperature than previously thought by increasing the amount of low molecular weight dew point increasing component and actually increase maximum production rates, while avoiding problems of resin stickiness. We also found that the recovery of condensable components from the purge bin and reactor vent streams can be improved through the use of an enhanced recovery system.

SUMMARY OF THE INVENTION

This invention relates to a continuous gas phase polymerization process for polymerizing a catalyst, for example, a Ziegler-Natta, organochromium, chrome oxide, or single-site catalyst, in a gas phase fluidized-bed reactor operating with a low molecular weight dew point increasing component or a combination of a low molecular weight dew point increasing component and a high molecular weight dew point increasing component present in the cycle gas.

One embodiment of the current invention relates to a gas phase polymerization process including the steps of passing a recycle stream through a fluidized bed in a gas phase fluidized bed reactor, wherein the recycle stream comprises a low molecular weight dew point increasing component and a high molecular weight dew point increasing component, polymerizing an alpha-olefin monomer in the presence of catalyst, and controlling an amount of low molecular weight dew point increasing component in the recycle stream such that the dew point approach temperature of the recycle stream is less than the dew point approach temperature when operating with the higher molecular weight dew point increasing component alone.

In another embodiment, this invention relates to a gas phase polymerization process including the steps of passing a recycle stream through a fluidized bed in a gas phase fluidized bed reactor, wherein the recycle stream comprises a low molecular weight dew point increasing component and a high molecular weight dew point increasing component, polymerizing an alpha-olefin monomer in the presence of a catalyst, and controlling a ratio of the amount of low molecular weight dew point increasing component to the amount of high molecular weight dew point increasing component in the recycle stream.

Still another embodiment of the current invention relates to a gas phase polymerization process including the steps of: (1) passing a recycle stream through a fluidized bed in a gas phase fluidized bed reactor at an initial production rate; (2) polymerizing an alpha-olefin monomer in the presence of a catalyst in the gas phase fluidized bed reactor; (3) establishing a composition of the recycle stream, wherein the recycle stream comprises a low molecular weight dew point increasing component and a high molecular weight dew point increasing component; (4) determining an initial maximum allowable dew point temperature of the recycle stream for the given bed temperature; and (5) increasing the amount of the low molecular weight dew point increasing component, such that an actual dew point temperature of the recycle stream is greater than the initial maximum allowable dew point temperature. One embodiment of this alternative further relates to increasing the production rate in the gas phase reactor such that the actual production rate is greater than the initial production rate. Another embodiment further relates to controlling a ratio of the low molecular weight dew point increasing component to the high molecular weight dew point increasing component.

Another alternate embodiment of the current invention relates to a gas phase polymerization process including the steps of: (1) passing a recycle stream through a fluidized bed in a gas phase fluidized-bed reactor; (2) polymerizing an alpha-olefin monomer in the presence of a catalyst in the gas phase fluidized-bed reactor; (3) establishing a composition of the recycle stream and an initial production rate in the gas phase fluidized-bed reactor, wherein the recycle stream comprises a low molecular weight dew point increasing component and a high molecular weight dew point increasing component; (4) determining an initial maximum allowable dew point of the recycle stream; and (5) increasing the amount of the low molecular weight dew point increasing component in the recycle stream such that an actual condensing level of the recycle stream is greater than the initial maximum allowable dew point. A further embodiment of this alternative includes the step of increasing the production rate in the gas phase reactor such that the actual production rate is greater than the initial production rate.

Another alternate embodiment of the current invention provides for a gas phase polymerization process comprising the steps of: (1) passing a recycle stream through a fluidized bed in a gas phase fluidized bed reactor, wherein the recycle stream comprises a low molecular weight dew point increasing component; (2) polymerizing an alpha-olefin monomer in the presence of a catalyst in the gas phase fluidized-bed reactor; (3) forming a system vent stream comprising gases from the gas phase fluidized bed reactor; (4) passing the system vent stream through a recovery system, wherein a portion of the system vent stream is condensed and recovered, and wherein a non-condensed vent stream is formed; (5) passing the non-condensed vent stream to an enhanced recovery system; (6) separating a hydrocarbon-rich stream and a hydrocarbon-lean stream from the non-condensed vent stream in the enhanced recovery system; and (7) recycling the hydrocarbon-rich stream to the recovery system to recover a condensable portion of the hydrocarbon-rich stream.

Yet another alternate embodiment of the current invention relates to a gas phase polymerization process including the steps of: (1) passing a recycle stream through a fluidized bed in a gas phase fluidized bed reactor, wherein the recycle stream comprises a low molecular weight dew point increasing component; and (2) polymerizing an alpha-olefin monomer in the presence of a catalyst in the gas phase fluidized-bed reactor, wherein the polymerization is operated in a condensed mode, and wherein a level of condensable fluid in the recycle stream entering the gas phase fluidized bed reactor is greater than about 2 mole percent based on the total moles of the recycle stream entering the gas phase fluidized bed reactor.

DETAILED DESCRIPTION OF THE INVENTION

Figure 1:
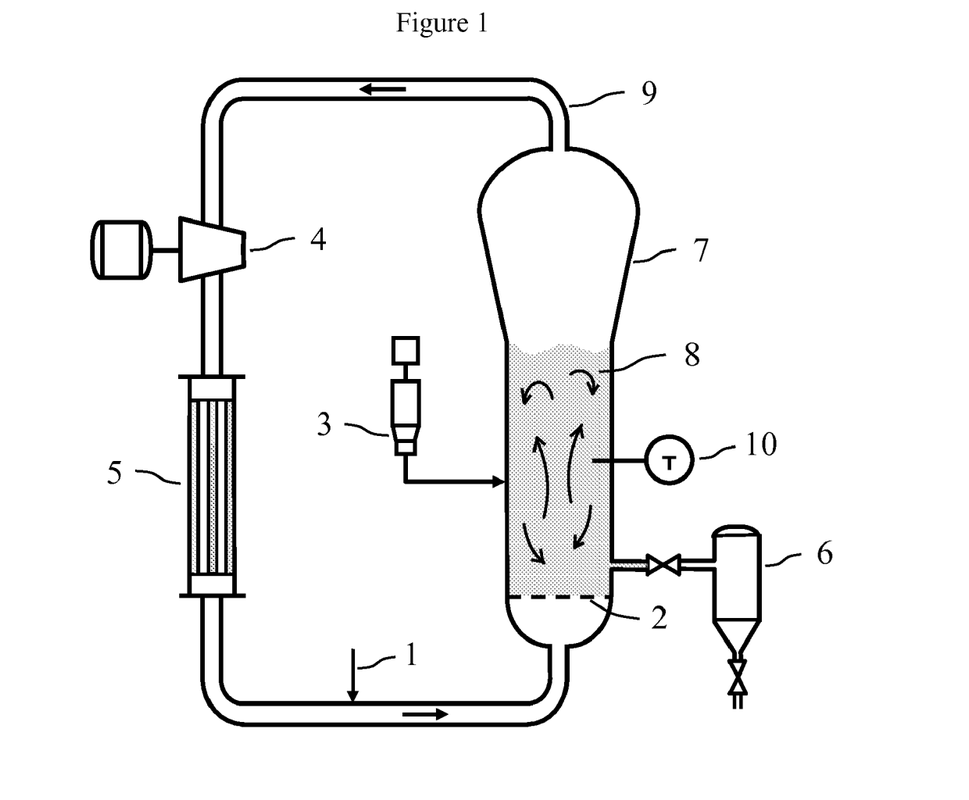
FIG. 1 is a drawing of a typical gas phase process.

The invention is generally directed toward a polymerization process, particularly a gas phase process for polymerizing one or more monomer(s) in the presence of a catalyst system. As shown in FIG. 1, a typical gas phase process comprises a fluidized bed and/or gas phase reactor 7, a product discharge apparatus 6 and a recycle stream 9. Monomer is fed into the reactor via monomer feed 1, enters the gas phase reactor 7 and is swept upward through a distributor plate 2 into a fluidized-bed mixing zone 8, provided with at least one temperature probe 10. Catalyst feed 3 is injected into the gas phase reactor 7 directly into the mixing zone 8. The catalyst causes the monomer to polymerize in the mixing zone 8. The polymer is withdrawn via the discharge apparatus 6; at the same time the recycle stream 9 is withdrawn from the reactor 7 and passed to a compressor 4, from the compressor to a heat exchanger 5, and thereafter passed back into the reactor 7 with the monomer feed 1. Additional gas and/or liquid streams can be fed into the recycle line either upstream or downstream of the cooler, for example, recovered hydrocarbon liquid from the discharge apparatus 6 is typically fed downstream of the cooler.

The invention also relates to a polymerization process having improved operating efficiency when operating with low molecular weight dew point increasing components or a combination of low molecular weight dew point increasing components and high molecular weight dew point increasing components. It has been surprisingly discovered that operating with a low molecular weight dew point increasing component at conditions outside the usual commercial conditions in a gas phase polymerization process (e.g., a smaller dew point approach temperature) provides for a substantially improved polymerization process and the production of polymers at higher production rates than previously allowable. It is also surprising that a blend of a low molecular weight dew point increasing component and a high molecular weight dew point increasing component allows for a substantially improved polymerization process.

We have found that problems associated with polymer stickiness induced by condensables in the reactor can be significantly reduced or even eliminated by a process involving: (1) determining the dry sticking temperature of the polymer to be produced, (2) determining the melting point depression of the polymer that occurs when a sample of the polymer to be produced is immersed in a liquid (or liquid mixture) of the condensables to be used in the process (ICA and comonomer), and (3) operating the gas phase reactor process with a bed temperature below a Critical Temperature, defined as the dry sticking temperature minus melting point depression. With the bed temperature below the Critical Temperature, stickiness in the resin due to high condensables concentrations is reduced or eliminated altogether. Hence, the condensable concentrations in the reactor can then be raised to obtain higher dew point temperatures, higher condensing levels, and higher production rates.

We have also surprisingly found that problems associated with polymer stickiness induced by condensables in the reactor while operating above the Critical Temperature can be significantly reduced by a process involving: (1) passing a recycle stream through a fluidized bed in a gas phase fluidized bed reactor, wherein the recycle stream comprises a low molecular weight dew point increasing component and a high molecular weight component, (2) polymerizing an alpha-olefin monomer in the presence of a catalyst, and (3) controlling an amount of the low molecular weight dew point increasing component in the recycle stream such that a dew point approach temperature of the recycle stream is less than the dew point approach temperature when operating with the higher molecular weight dew point increasing component alone. With the presence of the low molecular weight dew point increasing component, stickiness in the resin due to high condensable concentrations is reduced. Hence, the condensable concentrations in the reactor can then be raised to obtain higher dew point temperatures, higher condensing levels, and higher production rates.

Furthermore, we have found that controlling a ratio of the amount of a low molecular weight dew point increasing component to the amount of a high molecular weight dew point increasing component allows for operating with increasing condensing levels, and/or higher dew point temperatures.

Even further, we have found that inefficiencies created by operating with low molecular weight dew point increasing components can be improved by utilizing an enhanced recovery system wherein quantities of the low molecular weight dew point increasing component that are lost using conventional recovery systems can be recovered and recycled back to the reaction system.

To better understand the instant invention, it is useful to discuss stickiness in gas phase reactors. Stickiness can be induced in polymers by two means: (1) raising the temperature of the material, or (2) by increasing the amount of dissolved components within the polymer for a given temperature. In the gas phase process, the dissolved components include the higher molecular weight (higher boiling) components in the reactor gas such as, comonomers (e.g., 1-butene or 1-hexene) and dew point increasing components, also referred to as "induced condensing agents" (ICA's). ICA's are inert condensable fluids (conventionally C5 or C6 saturated hydrocarbons) that are added to the reactor to increase the cooling capacity of the reactor system for increased production rates. Use of ICA's is further described in U.S. Pat. Nos. 5,352,749 and 5,436,304, both of which are fully incorporated herein by reference. Lower molecular weight components have lower solubility in the polymer, and some components such as ethylene, nitrogen and hydrogen typically have only minimal solubility in the polymer, and therefore do not tend to induce stickiness in the polymer. We also know that polymers with less dissolved hydrocarbons present, demonstrate improved purging and handling of the resin in equipment downstream of the gas phase reactor.

Figure 2:
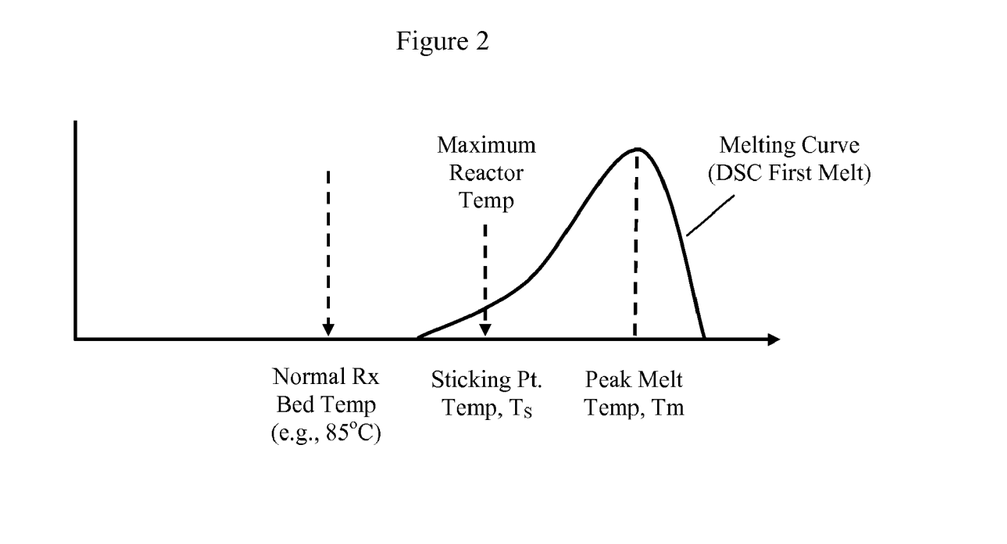
FIG. 2 shows an approximation of a typical DSC melting curve of a polymer illustrating a typical reactor temperature and the limiting resin sticking temperature (Ts) relative to the DSC melting curve.

FIG. 2 shows an approximation of a typical DSC melting curve of a polymer. The melting temperature is taken as the peak of the melting curve. The reactor bed temperature is normally operated considerably below the melting temperature as shown. For a typical LLDPE film resin (0.917 g/cc density, melt index of 1 dg/min) the melting temperature of the polymer is in the range of 119 to 127° C. (as measured dry, without dissolved components). For these grades the bed temperature would normally be set at 84 to 87° C. Stickiness in the polymer would be induced if the reactor bed temperature were increased to the point at which it would begin to overlap the polymer melting curve as shown in the figure. For Ziegler-Natta catalyzed resins, stickiness occurs when approximately 15% overlap occurs (i.e., 15% of the crystalline fraction of the polymer melted). For metallocene catalyzed resins, a higher degree of overlap is required to induce stickiness. While the exact number is not known for metallocene, it is believed to be in the range of 30 to 40%.

Stickiness can also be induced in the polymer product by increasing the concentration of condensables in the reactor gas phase. The condensables become dissolved in the polymer and act to depress the polymer melt curve. Stickiness in the polymer results when the melting curve is depressed to the point at which it overlaps the reactor operating temperature (the bed temperature). This is particularly problematic with high molecular weight dew point increasing components. U.S. Patent Publication No. 2005-0267269, published Dec. 1, 2005, defines and discloses the calculation of a Critical Temperature. If the reactor bed temperature is reduced so that it is equal to or less than the critical temperature, it is theoretically difficult, if not impossible, to induce stickiness in the resin by partial melting of the polymer, regardless of the concentration of condensable components in the reactor system. It is therefore possible to increase the ICA concentration to the point at which the dew point temperature of the reactor gas is equal to the bed temperature. This would saturate the reactor gas with the ICA, but will not induce stickiness in the fluid bed.

However, it is sometimes desirable to operate a reactor system at temperatures above the Critical Temperature defined in U.S. Patent Publication No. 2005-0267269, published Dec. 1, 2005. In these applications, empirically developed limits of dew point approach temperature are traditionally used to determine operating limits. When operating the reactor system above the Critical Temperature, the closer the dew point gets to the reactor bed temperature, the greater the likelihood of the polymer particles in the bed sticking together. As a result of polymer sticking together, fluidization instabilities can occur. This may cause the formation of agglomerates in the fluidized bed and problems with downstream activities, such as polymer removal, transfer, purging, extrusion, and the like. Operating parameters vary according to the product and catalyst system. However, conventional operating guidelines developed empirically suggest that when operating above the Critical Temperature it is best to maintain the dew point temperature of the recycle gas at least about 5° C. below the reactor bed temperature when operating with metallo-organic, single-site catalysts and greater than at least about 20° C. temperature below the reactor bed temperature, particularly when operating with Ziegler-Natta-type or organochromium type catalysts.

The term "dew point increasing component" is used herein to exclude polymerizable monomers, including those that raise the dew point. For the purposes of this patent specification, the term "dew point increasing component" includes saturated or non-polymerizable unsaturated hydrocarbons. Examples of suitable dew point increasing components are readily volatile liquid hydrocarbons, which may be selected from saturated hydrocarbons containing from 3 to 10 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and/or mixtures thereof. Preferably, the stream contains a total of from about 5 to about 60 mole percent of a dew point increasing component(s). The dew point itself is calculated from the feed gas composition as analyzed, for example, by gas chromatography. Dew point temperature can be calculated using any relevant equation of state. One suitable method uses the Suave-Redlich-Kwong (SRK) as the reference equation of state. In combination with actual recycle gas temperatures and pressures, the level of condensed liquid in the recycle stream is also calculated. The level of condensed liquid in the recycle stream is expressed as mole percent (mole %) or weight percent (wt %) of condensed liquids in the recycle stream at the point the recycle stream enters the reactor.

The term "low molecular weight dew point increasing component" is used herein to refer to saturated or non-polymerizable unsaturated hydrocarbons containing from 3 to 4 carbon atoms. Some suitable low molecular weight dew point increasing components include propane, n-butane, isobutane, and mixtures thereof.

The term "high molecular weight dew point increasing component" is used herein to refer to saturated or non-polymerizable unsaturated hydrocarbons containing from 5 to 10 carbon atoms. Some suitable high molecular weight dew point increasing components include n-pentane, isopentane, neopentane, n-hexane, isohexane, and other saturated $C_6$ hydrocarbons, n-heptane, n-octane and other saturated $C_7$ and $C_8$ hydrocarbons, and/or mixtures thereof.

The term "dew point approach temperature" is used herein to refer to the difference between the reactor bed temperature and the dewpoint temperature of the recycle gas. Any of the embodiments described herein are preferably operated with a dew point approach temperature of less than 20° C., preferably less than 15° C., preferably less than 10° C., preferably less than 5° C., and even as low as less than 2° C. Thus, in any of the embodiments described herein, the dew point temperature of the recycle gas is preferably within 20° C. of the bed temperature, preferably within 15° C. of the bed temperature, preferably within 10° C. of the bed temperature, preferably within 5° C. of the bed temperature, and even as low as within 2° C. of the bed temperature.

Preferred catalyst systems or polymerization catalysts for any of the embodiments herein include, but are not limited to, conventional-type transition metal catalysts such as a Ziegler-Natta-type catalyst, a chrome oxide catalyst, or an organochromium catalyst. Furthermore, preferred catalyst systems include a bulky ligand metallocene-type catalyst (referred to herein as a single-site catalyst).

In a preferred embodiment, any of the polymerization processes described herein are substantially continuous processes. By continuous is meant a system that operates (or is intended to operate) without interruption or cessation for extended periods of time (days, weeks, or months). For example, a continuous process to produce a polymer would be one in which the reactants are continuously introduced into one or more reactors and polymer product is continually withdrawn. Any of the embodiments described herein are preferably continuously operated for at least 12 hours, preferably at least 24 hours, preferably at least 36 hours, preferably at least 48 hours, preferably at least 72 hours, preferably at least 7 days, preferably at least 14 days, preferably at least 21 days, and even preferably at least 30 days.

One embodiment of the current invention provides for a gas phase polymerization process for passing a recycle stream through a fluidized bed in a gas phase fluidized bed reactor, wherein the recycle stream comprises a low molecular weight dew point increasing component and a high molecular weight component, polymerizing an alpha-olefin monomer in the presence of catalyst, and controlling an amount of low molecular weight dew point increasing component in the recycle stream such that the dew point approach temperature of the recycle stream is less than the dew point approach temperature when operating with the higher molecular weight dew point increasing component alone.

The dew point increasing components of any embodiments herein using a low molecular weight dew point increasing component and a high molecular weight dew point increasing component can be any combination of one or more low molecular weight dew point increasing component(s) and high molecular weight dew point increasing component(s). For example, suitable combinations of dew point increasing components include: a low molecular weight dew point increasing component of n-butane, and a high molecular weight dew point increasing component of n-pentane, isopentane, n-hexane, isohexane, n-heptane, n-octane, and/or mixtures thereof; a low molecular weight dew point increasing component of isobutane, and a high molecular weight dew point increasing component of n-pentane, isopentane, n-hexane, isohexane, n-heptane, n-octane, and/or mixtures thereof; a low molecular weight dew point increasing component of propane, and a high molecular weight dew point increasing component of n-pentane, isopentane, n-hexane, isohexane, n-heptane, n-octane, and/or mixtures thereof; a low molecular weight dew point increasing component of isobutane and propane, and a high molecular weight dew point increasing component of n-pentane, isopentane, n-hexane, isohexane, n-heptane, n-octane, and/or mixtures thereof; a low molecular weight dew point increasing component of propane and n-butane, and a high molecular weight dew point increasing component of n-pentane, isopentane, n-hexane, isohexane, n-heptane, n-octane, and/or mixtures thereof; or a low molecular weight dew point increasing component of isobutane and n-butane, and a high molecular weight dew point increasing component of n-pentane, isopentane, n-hexane, isohexane, n-heptane, n-octane, and/or mixtures thereof.

The minimum dew point approach temperature when operating with a high molecular weight dew point increasing component alone is typically determined empirically using prior operating experience when operating while feeding the higher molecular dew point increasing component alone and not feeding a low molecular weight dew point increasing component. As used herein, "operating with a high molecular weight dew point increasing component alone" means that the only dew point increasing component being fed to the gas phase reaction system as a fresh make up feed is a high molecular weight dew point increasing component. It is well known that some low molecular weight dew point increasing components may be present in small quantities in the comonomer feed, and some may form in the gas phase reaction system in certain reactions with the catalyst system. With a conventional vent recovery system, these low molecular weight dew point increasing components typically do not accumulate to represent a significant concentration in the gas phase reaction system. For example, it is common practice to operate in condensing mode by providing a fresh makeup stream of isopentane as a high molecular weight dew point increasing component. The minimum dew point approach temperature when operating with the high molecular weight dew point increasing component is determined empirically by increasing the amount of dew point increasing component and observing the dew point approach temperature at the onset of unstable operation. Unstable operation is typically evidenced by the production of agglomerates, deviations of temperatures in the lower portion of the fluidized bed, instabilities of the fluidized bulk densities, or other stability monitoring methods. Thus, the minimum dew point approach temperature was the dew point temperature of the recycle gas observed at the onset of unstable operation. Operating with a dew point approach temperature less than the minimum results in unstable operation. Operating guidelines, therefore, require that the dew point approach temperature be maintained greater than the minimum dew point approach temperature.

In the past, this empirical method has typically resulted in establishing operating guidelines that require the dew point approach temperature be maintained greater than about 20° C., particularly when operating with Ziegler-Natta or organochromium catalyst systems. This minimum dew point approach temperature was then applied generally to all condensing mode operation for that catalyst type, regardless of what dew point increasing component was used in the future.

The amount of the low molecular weight dew point increasing component in the recycle stream is controlled by any suitable method of controlling reactor gas components in a gas phase reaction system. For example, suitable methods of controlling the amount of low molecular weight dew point increasing component present include controlling the feed rate of fresh low molecular weight dew point increasing component to the reaction system, controlling the reed rate of a stream of recovered low molecular weight dew point increasing component to the reaction system (recovered in a conventional or enhanced vent recovery system), venting gases from the reaction system, or changing the quantity of other recycle components in the reaction system.

Another embodiment of the current invention provides for a gas phase polymerization process including the steps of passing a recycle stream through a fluidized bed in a gas phase fluidized bed reactor, wherein the recycle stream comprises a low molecular weight dew point increasing component and a high molecular weight component, polymerizing an alpha-olefin monomer in the presence of a catalyst, and controlling a ratio of the amount of low molecular weight dew point increasing component to the amount of high molecular weight dew point increasing component in the recycle stream.

The ratio of the amount of low molecular weight dew point increasing component to the amount of high molecular weight dew point increasing component in the recycle stream is controlled by any suitable method of controlling reactor gas component ratios in a gas phase reaction system. In one embodiment, the amount of low molecular weight increasing component is controlled by a ratio control loop. For example, suitable methods of controlling the ratio include analyzing the composition of the recycle gas, determining a molar or weight ratio, then changing the feed rate of fresh low molecular weight dew point increasing component to the reaction system, changing the feed rate of a stream of recovered low molecular weight dew point increasing component to the reaction system (recovered in a conventional or enhanced vent recovery system), venting gases from the reaction system, and/or changing the quantity of other recycle components in the reaction system. In another embodiment, the ratio is controlled by controlling the amount of high molecular weight increasing component present using similar methods to those described above.

Embodiments controlling the ratio of the amount of low molecular weight dew point increasing component to the amount of high molecular weight dew point increasing component in the recycle stream preferably control a weight ratio or a molar ratio. Embodiments of the invention preferably control the molar ratio of low molecular weight dew point increasing component to the high molecular weight dew point increasing component at a value of greater than about 20/80, greater than about 30/70, in a range of about 30/70 to 90/10, or in a range of about 40/60 to about 80/20.

In one embodiment of the invention controlling the ratio of the amount of low molecular weight dew point increasing component to the amount of high molecular weight dew point increasing component in the recycle stream, the ratio is controlled such that a dew point approach temperature of the recycle stream is less than a dew point approach temperature when operating with the higher molecular weight dew point increasing component alone.

An alternate embodiment of the current invention provides for a gas phase polymerization process including the steps of: (1) passing a recycle stream through a fluidized bed in a gas phase fluidized bed reactor at an initial production rate; (2) polymerizing an alpha-olefin monomer in the presence of a catalyst in the gas phase fluidized bed reactor; (3) establishing a composition of the recycle stream, wherein the recycle stream comprises a low molecular weight dew point increasing component and a high molecular weight dew point increasing component; (4) determining an initial maximum allowable dew point temperature of the recycle stream; and (5) increasing the amount of the low molecular weight dew point increasing component in the recycle stream, such that an actual dew point temperature of the recycle stream is greater than the initial maximum allowable dew point temperature. One embodiment of this alternative further includes the step of increasing the production rate in the gas phase reactor such that the actual production rate is greater than the initial production rate. Another embodiment of this alternative further includes the step of controlling a ratio of the low molecular weight dew point increasing component to the high molecular weight dew point increasing component.

The initial maximum allowable dew point temperature is typically determined empirically considering the prior operating experience. For example, it is common practice to operate in condensing mode by providing a fresh makeup stream of a high molecular weight dew point increasing component, such as isopentane, to the reaction system. The maximum allowable dew point temperature for a given bed temperature and product is determined empirically by raising the amount of dew point increasing component(s) present and observing the dew point temperature at the onset of unstable operation. Unstable operation is typically evidenced by the production of agglomerates, deviations of temperatures in the lower portion of the fluidized bed, instabilities of the fluidized bulk densities, or other stability monitoring methods. Thus, conventionally, the maximum allowable dew point approach temperature for a given bed temperature was the dew point temperature of the recycle gas observed at the onset of unstable operation.

In the past, this empirical method was typically conducted with high molecular weight dew point increasing components and resulted in establishing operating guidelines that required the maximum allowable dew point temperature of the recycle gas be maintained at an amount less than the bed temperature. Because the risk to operations of the gas phase reaction system when conducting these tests is great, the tests were typically not reproduced for each product and composition. This resulted in an empirically determined operating guideline that required the dew point be maintained at a value below the bed temperature for all condensing mode operation for that catalyst type. For Ziegler-Natta and chrome oxide catalysts, this value was typically at least about 20° C. The maximum allowable dew point temperature for a particular operating condition was then determined by subtracting the empirically determined value from the bed temperature. For example, when operating a gas phase reaction system with a Ziegler-Natta catalyst, producing a polymer with about a 1.0 melt index at a bed temperature of about 85° C., and an empirical determined value of about 200 below bed temperature, the maximum allowable dew point temperature of the recycle gas is about 65° C.

The amount of low molecular weight dew point increasing component present in the recycle system can be increased by a variety of methods. Typically, that amount of dew point increasing component is increased by feeding a stream of that component to the reaction system. Because reactor and purge vessel vent streams contain significant amounts of dew point increasing components, these components are preferably recovered and recycled back to the gas phase reaction system. However, recovery systems do not recover all of the escaping dew point increasing components. Some amount of dew point increasing component is lost in the reactor vent stream or a vent stream exiting the vent recovery system. Thus, another method of increasing the amount of low molecular weight dew point increasing component present in the recycle stream is to recover and recycle more of the low molecular weight dew point increasing component from these streams.

Another alternate embodiment of the current invention provides for a gas phase polymerization process including the steps of: (1) passing a recycle stream through a fluidized bed in a gas phase fluidized bed reactor; (2) polymerizing an alpha-olefin monomer in the presence of a catalyst in the gas phase fluidized bed reactor; (3) establishing a composition of the recycle stream and at an initial production rate in the gas phase fluidized bed reactor, wherein the recycle stream comprises a low molecular weight dew point increasing component and a high molecular weight dew point increasing component; (4) determining an initial maximum allowable condensing level of the recycle stream; and (5) increasing the amount of the low molecular weight dew point increasing component in the recycle stream such that an actual condensing level of the recycle stream is greater than the initial maximum allowable condensing level. A further embodiment of this alternative includes the step of increasing the production rate in the gas phase reactor such that the actual production rate is greater than the initial production rate.

The initial maximum allowable dew point is typically determined empirically considering the prior operating experience. The maximum allowable dew point is preferably expressed as a weight or mole percent condensing. The maximum allowable condensing level for a given product or set of reactor operating conditions and temp constraints, such as cooling water temperature, is determined empirically by raising production rates and observing the condensing level temperature at the onset of unstable operation. Unstable operation is typically evidenced by loss of control for the bed temperature, the production of agglomerates, deviations of temperatures in the lower portion of the fluidized bed, instabilities of the fluidized bulk densities, or other stability monitoring methods. Thus, the maximum allowable condensing level for a given product or set of reactor operating conditions was the condensing level of the recycle gas observed at the onset of unstable operation.

In the past, this empirical method was typically conducted with high molecular weight dew point increasing components and resulted in establishing operating guidelines that required the maximum allowable condensing level of the recycle gas be maintained less than the maximum allowable condensing level. Because the risk to operations of the gas phase reaction system when conducting these tests is great, these tests are typically not reproduced for each product and composition. This results in an empirically determined operating guideline that requires the condensing level be maintained at values less than necessary based on a worst-case reactor condition.

The amount of low molecular weight dew point increasing component present in the recycle system can be increased by any of the methods described herein above.

The actual condensing level of the recycle gas, as used herein, refers to the liquid condensing level of the recycle gas in the reactor inlet at any particular time as calculated by a physical properties program using a current recycle gas composition and a current reactor inlet temperature. The actual condensing level is preferably greater than 2 wt %, preferably greater than 10 wt %, preferably greater than 15 wt %, preferably greater than 25 wt %, and even greater than 30 wt %, based on the total mole of the liquid and gas entering the reactor.

Figure 4:
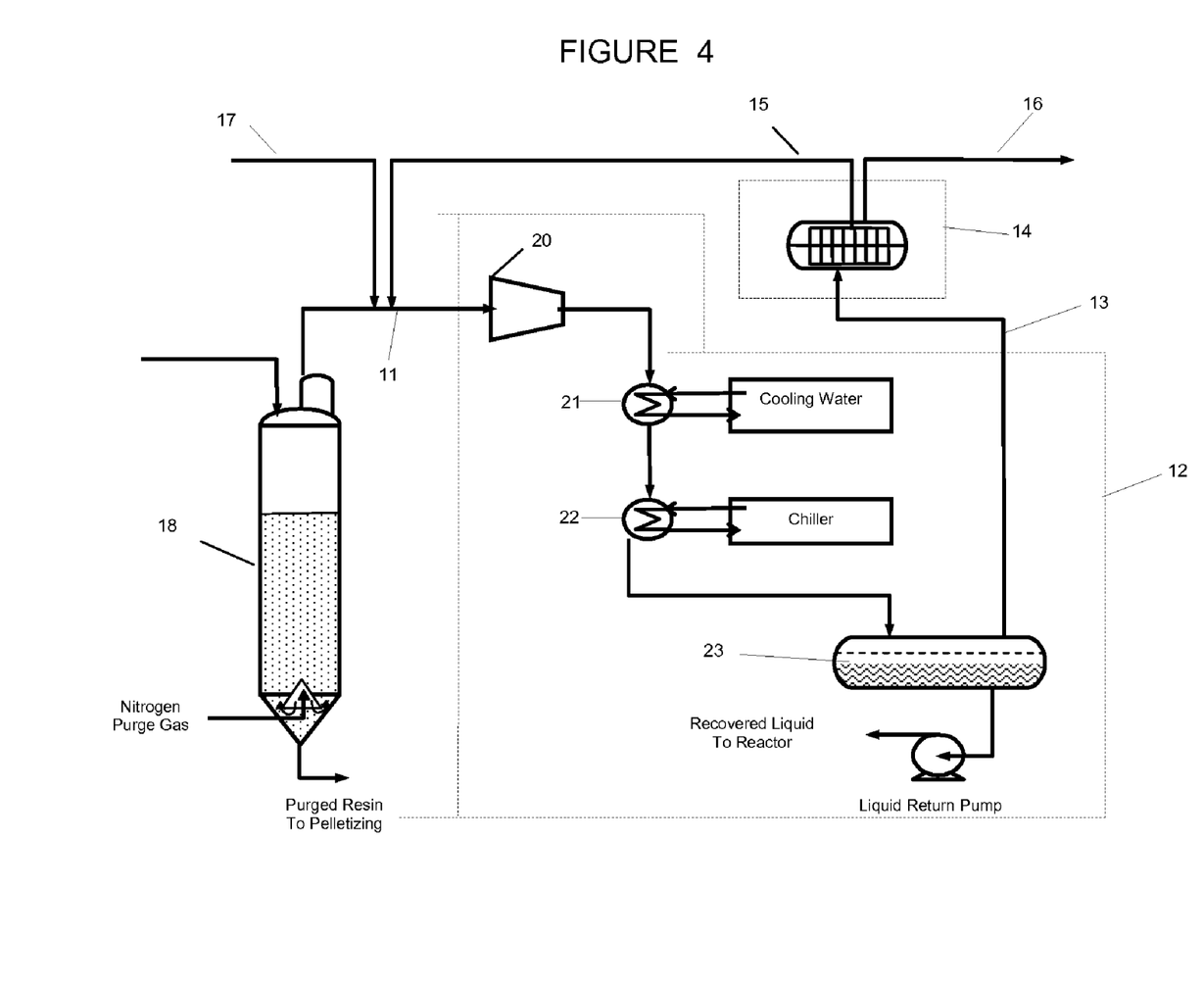
FIG. 4 is a schematic diagram of one embodiment of the current invention using an enhanced recovery system.

Referring to FIG. 4, another alternate embodiment of the current invention provides for a gas phase polymerization process comprising the steps of: (1) forming a system vent stream 11 comprising gases from the gas phase fluidized bed reactor; (2) passing the system vent stream 11 through a recovery system 12, wherein a portion of the system vent stream is condensed and recovered, and wherein a non-condensed vent stream 13 is formed; (3) passing the non-condensed vent stream 13 to an enhanced recovery system 14; (4) separating a hydrocarbon-rich stream 15 and a hydrocarbon-lean stream 16 from the non-condensed vent stream in the enhanced recovery system; and (5) recycling the hydrocarbon-rich stream to the system vent stream 11 to recover a condensable portion of the hydrocarbon-rich stream.

A system vent stream may comprise any gases that are released from the gas phase reactor or reaction system. In one embodiment of the current invention, the system vent stream comprises a reactor vent gas 17. A reactor vent gas 17 typically comprises reactor gases that are released directly from the gas phase reactor system, typically from a point in the recycle loop. The reactor vent gas 17 is released to purge the gas phase reaction system of undesirable components, lower reactor pressure, control recycle gas compositions, or other operational requirements where it is necessary to vent gases directly from the gas phase reactor. The reactor vent gases 17 contain significant quantities of valuable monomer(s), comonomer(s), and dew point increasing components. It is typically desirable to capture and recycle as much of the contained valuable gases as possible.

A system vent stream 11 may also contain other streams containing recycle gases that may represent losses to the process if released without recovering the contained monomer, comonomer, or dew point increasing components. Referring again to FIG. 4, in one embodiment, the system vent stream comprises dissolved gases and entrained gases exiting a purge vessel 18. It is well known in the art that polymerized resin exiting the gas phase reactor contains dissolved gases that comprise monomer, comonomer, and dew point increasing components of the recycle stream. It is also known, that when polymerized resin is transferred from the gas phase reactor, that a certain amount of recycle gas is entrained with the resin. The dissolved gases and the entrained gases are separated from the polymerized resin in the purge vessel 18, located downstream of the gas phase reactor. In one embodiment of the invention, the process further comprises the steps of: (1) transferring a polymer and entrained gases from the gas phase fluidized bed reactor to a purge vessel 18, wherein the polymer comprises a plurality of dissolved gases, and wherein the dissolved gases and the entrained gases comprise the low molecular weight increasing component; (2) purging the dissolved gases from the polymer in the purge vessel 18; and (3) forming the system vent stream 11, wherein the system vent stream 11 comprises the dissolved gases and the entrained gases.

Still referring to FIG. 4, the system vent stream 11 passes to a recovery system 12. The recovery system 12 may be of any configuration suitable for the recovery of monomers, comonomers, and/or dew point increasing components. The recovery system typically comprises a compressor 20 with at least one stage of compression followed by a cooler 21 and chiller 22 wherein a portion of the system vent stream is condensed, forming a stream containing condensed liquid and non-condensed gases. The condensed liquid stream is then recovered by separating the condensed liquid from the non-condensed gases in a recovered liquid drum 23. The recovered liquid is then pumped back to the gas phase reaction system and fed into the recycle line at a location either upstream or downstream of the cooler in the cycle gas loop (not shown). The non-condensed gases then pass out of the recovered liquid drum as the non-condensed vent stream 13.

Again referring to FIG. 4, the enhanced recovery system 14 is used to separate a hydrocarbon-rich stream 15 and a hydrocarbon-lean stream 16 from the non-condensed vent stream 13. The hydrocarbon-rich stream is then sent back to the recovery system 12 to recover a condensable portion of the hydrocarbon-rich stream. The enhanced recovery system 14 is any suitable system for separating hydrocarbon gases, particularly monomers, comonomers, and/or dew point increasing components, contained in the non-condensed vent stream 13 from the other, typically non-condensable, gases. The enhanced recovery may be by membrane separation, pressure swing absorption ("PSA"), or enhanced recovery condensing.

Membrane units may be any suitable membrane unit effective at separating hydrocarbons, preferably $C_2$ to $C_{10}$ hydrocarbons, from other gases, such as nitrogen, hydrogen, or other recycle components. Membrane units known in the art typically pass the hydrocarbon through the membrane as they permeate and reject nitrogen and other gases as a non-permeate. However, membrane units wherein hydrocarbons are the non-permeate and nitrogen and other gases are the permeate are also suitable with this invention.

PSA units may be any PSA system that is suitable for effecting the desired separation.

Figure 5:
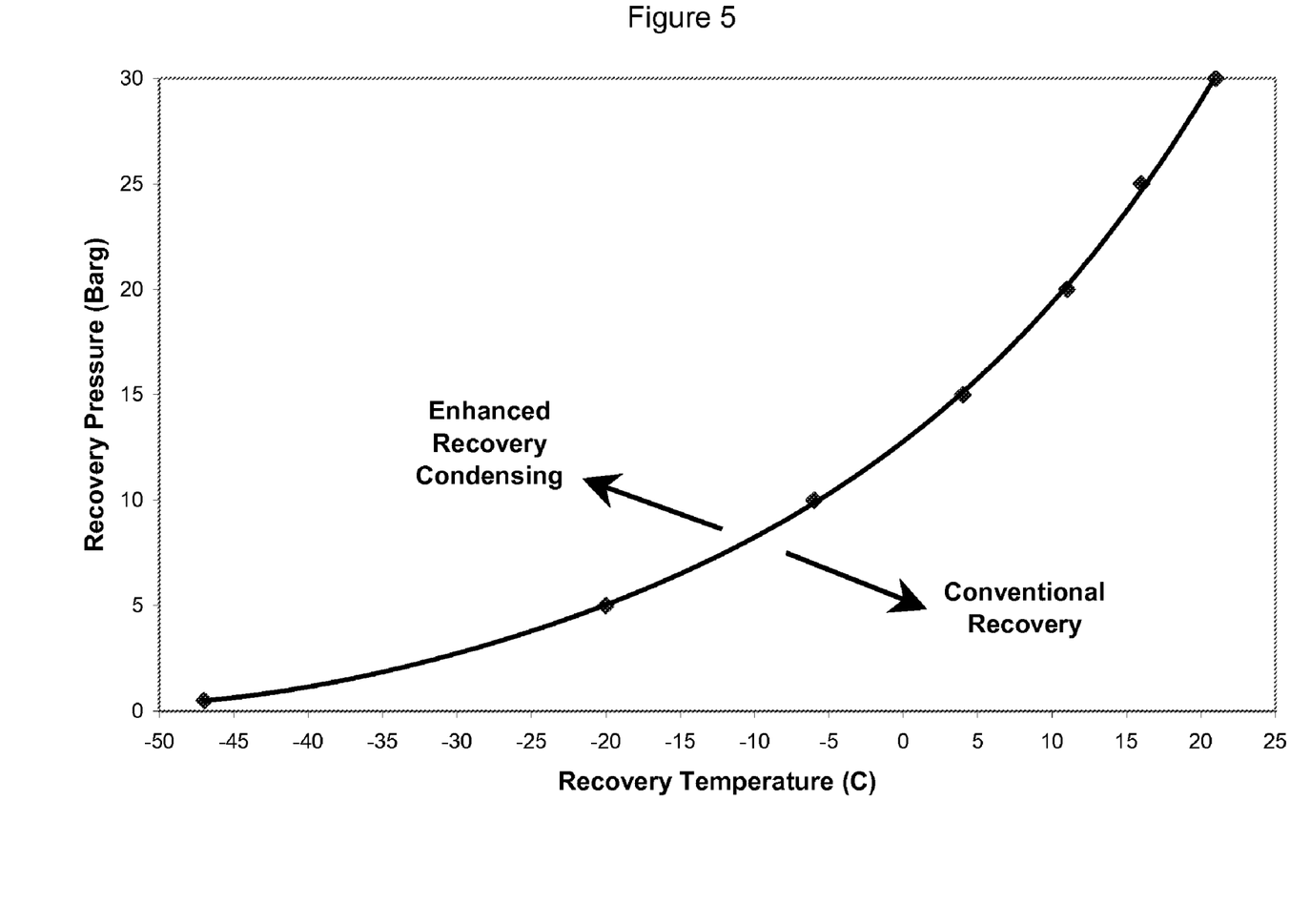
FIG. 5 is a graph showing the region of operating temperatures and pressures of one embodiment of an enhanced recovery system.

The term "enhanced recovery condensing" is used herein to refer to any system or method of condensing monomers, comonomers, and/or dew point increasing components using enhanced pressure or temperature. Enhanced recovery condensing systems typically compress and/or cool the non-condensed vent stream 13 followed by separation of the condensed liquid and non-condensed gases. Suitable methods of enhanced recovery condensing are those systems or methods that expose the non-condensed vent stream 13 to pressures and temperatures above the pressure/temperature curve shown in FIG. 5. In one embodiment of the invention, enhanced recovery condensing exposes the non-condensed vent stream 13 to: a temperature of less than about −30° C. at a pressure greater than about 3 Barg; a temperature of less than about −20° C. at a pressure greater than about 5 Barg; a temperature of less than about −15° C. at a pressure greater than about 6.5 Barg; a temperature of less than about −10° C. at a pressure greater than about 8 Barg; a temperature of less than about −5° C. at a pressure greater than about 10.5 Barg; or a temperature of less than about 0° C. at a pressure greater than about 13 Barg.

Another alternate embodiment of the current invention provides for a gas phase polymerization process including the steps of: (1) passing a recycle stream through a fluidized bed in a gas phase fluidized bed reactor, wherein the recycle stream comprises a low molecular weight dew point increasing component; and (2) polymerizing an alpha-olefin monomer in the presence of a catalyst, wherein the polymerization is operated in a condensed mode, and wherein a level of condensable fluid in the recycle stream entering the gas phase fluidized bed reactor is greater than about 2 wt % based on the total weight of the recycle stream entering the gas phase fluidized bed reactor.

For purposes of this invention and the claims thereto the term "bed temperature" is defined to mean the temperature of the fluidized bed measured at an elevation at least one-half of the reactor diameter above the distributor plate and at a radial distance at least 7 centimeters from the wall of the reactor.

Any of the embodiments herein may be operated with a polymerization catalyst that comprises a metal, and the molar ratio of the condensable fluid, to the metal is greater than 500:1, preferably in the range of from 900:1 to 10,000:1, preferably 1500:1 to 20,000:1.

Any of the embodiments described herein are preferably continuously operated below the Critical Temperature for at least 12 hours, preferably at least 24 hours, preferably at least 36 hours, preferably at least 48 hours, preferably at least 72 hours, preferably at least 7 days, preferably at least 14 days, preferably at least 21 days, preferably at least 30 days.

Polymerization Process

The polymerization catalysts and catalyst systems described above are suitable for use in any gas phase polymerization process, including fluidized bed or stirred bed processes. Particularly preferred is a gas phase polymerization process in which one or more condensable fluids as described herein are utilized.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. In a preferred process, a condensable fluid as described herein, is introduced to the process for purposes of increasing the cooling capacity of the recycle stream. The purposeful introduction of a condensable fluid into a gas phase process is a condensed mode process. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference).

Condensable Fluids

There are generally two types of condensable materials employed in gas phase reactor systems, comonomers and dew point increasing components (also referred to as induced condensing agents or "ICAs"). The comonomers are typically used to control the resin product density. Common comonomers employed in gas phase reactors are 1-butene, 1-hexene, and 4-methyl-1-pentene. These comonomers are considered condensable gases because (depending on concentration) they are relatively easily condensed at the typical inlet gas temperatures of 25 to 35° C. In contrast, ethylene, nitrogen and hydrogen in the reaction system are not typically condensable at these temperatures.

The second class of condensable gases in the reactor is the ICAs. The most common type of ICA is isopentane, but isobutane, n-hexane, or other hydrocarbons of similar boiling points may also be used. The role of the ICAs is to raise the dew point temperature of the reactor gas, so as to induce more condensing at the cooler reactor inlet gas conditions. The enhanced condensing that this provides gives additional reactor cooling capacity and enables higher production rates from the reactor. The use of ICAs is further explained in U.S. Pat. Nos. 5,352,749; 5,405,922; and 5,436,304; all of which are fully incorporated herein by reference.

The condensable fluids useful in this invention are preferably inert to the catalyst, reactants and the polymer product produced; it may also include comonomers. The condensable fluids can be introduced into the reaction/recycle system or at any other point in the system. The condensable fluids may also include polymerizable condensable comonomers such as olefins, diolefins, or mixtures thereof including some of the monomers mentioned herein which may be partially or entirely incorporated in the polymer product. Preferably, the feed or recycle stream contains from about 5 to about 60 mole percent of a condensable fluid, preferably with the condensable fluid having one carbon atom less than the comonomer or at least one carbon atom less than the comonomer.

In another embodiment, the dew point increasing component is present at more than 1 wt %, based upon the mole of the condensable fluid present in the reactor, preferably greater than 3 wt %, preferably greater than 5 wt %, preferably greater than 7 wt %, preferably greater than 10 wt %, preferably greater than 15 wt %, preferably greater than 20 wt %, preferably greater than 25 wt %, preferably greater than 30 wt %, preferably greater than 35 wt %, preferably greater than 40 wt %, preferably greater than 50 wt %, preferably greater than 55 wt %, preferably greater than 60 wt %, preferably greater than 70 wt %, preferably greater than 80 wt %, and preferably greater than 90 wt %. In another embodiment, the dew point increasing component is present at more than 1 mole %, based upon the mole of the dew point increasing components, monomers and any hydrocarbon solvent present in the reactor, preferably greater than 3 mole %, preferably greater than 5 mole %, preferably greater than 7 mole %, preferably greater than 10 mole %, preferably greater than 15 mole %, preferably greater than 20 mole %, preferably greater than 25 mole %, preferably greater than 30 mole %, preferably greater than 35 mole %, preferably greater than 40 mole %, preferably greater than 50 mole %, preferably greater than 55 mole %, preferably greater than 60 mole %, preferably greater than 70 mole %, preferably greater than 80 mole %, and preferably greater than 90 mole %. In the event that the mole basis is not named for the mole % dew point increasing component, it shall be presumed to be based upon the total weight of the dew point increasing components, monomers, and hydrocarbon solvents present in the reactor.

Monomers

In one embodiment, the process of this invention is directed toward a gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers, and cyclic olefins. Non-limiting monomers useful in the invention include butadiene, norbornene, norbornadiene, isobutylene, vinylbenzocyclobutane, ethylidene norbornene, isoprene, dicyclopentadiene and cyclopentene.

In a preferred embodiment of the process of the invention, a copolymer of ethylene is produced, where the ethylene and a comonomer having at least one alpha-olefin having from 3 to 15 carbon atoms, preferably from 4 to 12 carbon atoms, and most preferably from 4 to 8 carbon atoms, are polymerized in a gas phase process.

In another embodiment of the process of the invention, ethylene or propylene is polymerized with at least two different comonomers, optionally, one of which may be a diene, to form a terpolymer.

Condensed Mode Process

In a preferred gas phase process of the invention, the gas phase process is operated in a condensed mode, where an inert condensable fluid as described above is introduced to the process to increase the cooling capacity of the recycle stream. These inert condensable fluids are referred to as induced condensing agents or ICA's. For further details of a condensed mode process see U.S. Pat. Nos. 5,342,749 and 5,436,304.

To achieve higher cooling capacities, and enable higher reactor production rates, it is desirable to raise the dew point temperature of the recycle stream to permit a higher level of condensing at the inlet to the gas phase reactor. The dew point temperature of the recycle stream is typically raised by increasing the operating pressure of the reaction/recycle system and/or increasing the percentage of condensable fluids (ICA's and/or comonomers) and decreasing the percentage of non-condensable gases in the recycle stream. The advantages of a process operating in condensed mode generally increase directly with the nearness of the dew point temperature of the recycle stream to the reaction temperature within the interior of the fluidized bed. The advantages of the process may increase directly with the percentage of liquid in the recycle stream returned to the reactor. For a given inlet gas temperature, higher dew point temperatures cause an increased level of condensing (higher wt % condensed). The higher condensing levels provide additional cooling and hence higher production rate capability in the reactor.

In one preferred embodiment, the condensable fluid is present in an amount greater than 5 weight percent (wt %), preferably greater than 10 wt %, preferably greater than 15 wt %, preferably greater than 20 wt %, preferably greater than 25 wt %, preferably greater than 30 wt %, or preferably greater than 40 wt % based on the total weight of fluidizing medium being reintroduced into the reactor.

Reactor Conditions

The reactor pressure in any of the gas phase processes described in the above embodiments vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor bed temperature in any of the gas phase processes described in the above embodiments may vary from about 30° C. to about 120° C., preferably from about 60° C. to about 115° C., more preferably in the range of from about 70° C. to 110° C., and most preferably in the range of from about 70° C. to about 100° C. In another embodiment, the bed temperature is above room temperature (23° C.), preferably above 30° C., preferably above 50° C., and preferably above 70° C.

In a preferred embodiment, in any of the gas phase processes described in the above embodiments, the process is producing greater than 500 lbs of polymer per hour (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr), and most preferably greater than 65,000 lbs/hr (29,000 kg/hr) to greater than 100,000 lbs/hr (45,500 kg/hr).

In a preferred embodiment of the process of the invention, in any of the embodiments described herein, the condensable fluid is used in an amount such that the molar ratio of the condensable fluid(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio of from 500:1 to 20,000:1, preferably from 500:1 to 10,000:1, preferably from 900:1 to 8000:1, even more preferably from 2000:1 to 5000:1, and most preferably from to 2000:1 to 3500:1.

In another preferred embodiment of any of the embodiments of the process of the invention herein, the amount of one or more condensable fluids is determined by the partial pressure of the dew point increasing component being introduced to the process, particularly into the reactor. In this embodiment, the partial pressure of the condensable fluid (preferably a $C_2$ to $C_{10}$ saturated hydrocarbon) is in the range of from 1 psia (6.9 kPa) to 500 psia (3448 kPa), preferably is in the range from about 2 psig (13.8 kPa) to about 250 psia (1724 kPa), more preferably is in the range from about 2 psia (13.8 kPa) to about 100 psia (690 kPa), still more preferably in the range from about 5 psia (34.5 kPa) to about 90 psia (621 kPa), and most preferably in the range from about 5 psia (34.5 kPa) to about 80 psia (552 kPa).

Polymer Product of the Invention

The polymers produced by the process of the invention are useful in making a wide variety of products and useful in many end-use applications. The polymers produced by the process of the invention include linear low density polyethylenes, elastomers, plastomers, high density polyethylenes, low density polyethylenes, polypropylene, and polypropylene copolymers.

The polymers produced, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

In one embodiment, the polymers produced by the process of the invention typically have a molecular weight distribution, a weight average molecular weight to number average molecular weight ($M_w/M_n$) of greater than 1.5 to about 30, particularly greater than 2 to about 15, more preferably greater than 2 to about 10, even more preferably greater than about 2.2 to less than about 8, and most preferably from 2.5 to 8. The ratio of $M_w/M_n$ is measured by gel permeation chromatography techniques well known in the art.

In yet another embodiment, the ethylene-based polymers produced by the process of the invention typically have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. Typically when a bulky ligand metallocene-type polymerization catalyst is utilized in the process of the invention producing an ethylene copolymer, terpolymer and the like, the CDBI's are generally in the range of greater than 50% to 99%, preferably in the range of 55% to 85%, and more preferably 60% to 80%, even more preferably greater than 60%, still even more preferably greater than 65%. Typically when a conventional-type transition metal polymerization catalyst is utilized in the process of the invention producing an ethylene copolymer, terpolymer and the like, the CDBI's are generally less than 50%, more preferably less than 40%, and most preferably less than 30%. Also, whether a bulky ligand metallocene-type polymerization catalyst or a conventional-type transition metal polymerization catalyst is being used and the process is making an ethylene homopolymer, the CDBI is 100%.

Generally, the polymers produced by the process of the invention in one embodiment have a melt index (MI) or ($I_2$) as measured by ASTM-D-1238 (190° C./2.16 kg) in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. Also, generally, the polymers of the invention in an embodiment have a melt index ratio ($I_{21}/I_2$) [$I_{21}$ is measured by ASTM-D-1238 (190° C./21.6 kg)] of from 10 to less than 25, more preferably from about 15 to less than 25. Further, in another embodiment, the polymers have a melt index ratio ($I_{21}/I_2$) [$I_{21}$ is measured by ASTM-D-1238 (190° C./21.6 kg)] of from preferably greater than 25, more preferably greater than 30, even more preferably greater that 40, still even more preferably greater than 50 and most preferably greater than 65. In yet another embodiment, the polymers, particularly polymers produced in the process of the invention using a Ziegler-Natta-type polymerization catalyst, have a melt index ratio $(I_{21}/I_2)$ [$I_{21}$ is measured by ASTM-D-1238 (190° C./21.6 kg)] in the range of from 15 to 40, preferably in the range of from about 20 to about 35, more preferably in the range of from about 22 to about 30, and most preferably in the range of from 24 to 27.

In yet another embodiment, propylene based polymers are produced in the process of the invention. These polymers include atactic polypropylene, isotactic polypropylene, and syndiotactic polypropylene. Other propylene polymers include propylene random, block, or impact copolymers.

Polymers produced by the process of the invention are useful in such forming operations as film, sheet, and fiber extrusion and co-extrusion as well as blow molding, injection molding, and rotary molding. Films include blown or cast films formed by coextrusion or by lamination, shrink film, cling film, stretch film, sealing films, and oriented films. The films are useful in snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Tests were conducted on commercial gas phase reaction systems to investigate the effect of replacing a portion of a high molecular weight dew point increasing component with a low molecular weight dew point increasing component. For Examples 1 to 7, the process was initially operated feeding only a high molecular weight dew point increasing component and using a conventional vent recovery system. A mixture of n-butane and isobutane was then fed to the gas phase reaction system, and the feed of isopentane reduced in order to build a concentration of low molecular weight dew point increasing component. The test conditions and results are shown in Table 1. Examples 1-3 were operated without enhanced vent recovery (conventional vent recovery only). Examples 4-7 were obtained using an enhanced recovery system comprising a membrane separation device in a configuration shown in FIG. 4.

TABLE 1

|  | Pre-Membrane | | | Post Membrane | | | |
|---|---|---|---|---|---|---|---|
| EXAMPLE #: | 1 | 2 | 3 | 4 | 5 | 6 | 7 |
| Start | 2 Oct. 2002 | 11 Dec. 2002 | 20 May 2002 | 15 May 2003 | 14 Oct. 2003 | 24 Jun. 2003 | 28 Jul. 2003 |
| Duration (days) | 4 | 2 | 2 | 2 | 1 | 2 | |
| Approaching Fluidization Limit | N | y | Y | Y | N | N | Y |
| Rx Parameters | | | | | | | |
| MI | 1 | 1 | 2 | 1 | 1 | 2 | 2 |
| Production Rate (t/h) | 65.0 | 62.2 | 61.2 | 67.3 | 72.6 | 66.9 | 69.3 |
| P, rx, outlet (kPag) | 2200 | 2200 | 2200 | 2200 | 2200 | 2200 | 2200 |
| T, rx, bed (C.) | 85 | 85 | 84.2 | 85 | 85 | 85 | 85 |
| Superficial Gas Velocity (m/s) | 0.770 | 0.803 | 0.751 | 0.808 | 0.807 | 0.813 | 0.820 |
| Cycle Gas Rate (m3/h) | 51,762 | 53,980 | 50,485 | 54,316 | 54,249 | 54,653 | 55,123 |
| Recovered Liquids Rate (t/h) | 6.17 | 6.44 | 7.12 | 8.14 | 8.88 | 8.05 | 8.77 |
| T, inlet, dewpoint (C.) | 66.7 | 66.91 | 65.92 | 69.36 | 69.2 | 66.97 | 67.08 |
| Dew Point Approach Temp (C.) | 18.3 | 18.09 | 18.24 | 15.64 | 15.8 | 18.03 | 17.92 |
| Cycle Gas Composition | | | | | | | |
| H2 (mole %) | 6.79 | 7.05 | 9.92 | 7.56 | 6.94 | 9.93 | 9.80 |
| N2 (mole %) | 22.87 | 25.10 | 23.25 | 21.64 | 19.91 | 20.65 | 20.39 |
| C2= (mole %) | 38.22 | 38.54 | 36.51 | 36.69 | 37.49 | 36.62 | 36.53 |
| C2 (Ethane) (mole %) | 3.43 | 1.80 | 2.19 | 3.85 | 2.72 | 3.33 | 2.94 |
| C4= (mole %) | 14.65 | 14.02 | 13.97 | 13.23 | 14.80 | 13.53 | 14.74 |
| nC4 + iC4 (mole %) | 3.21 | 2.65 | 3.69 | 5.71 | 8.53 | 6.04 | 6.51 |
| Other C4 Inerts (mole %) | 1.13 | 0.31 | 1.01 | 0.99 | 1.26 | 0.67 | 0.25 |
| iC5 (mole %) | 5.82 | 6.08 | 5.67 | 6.24 | 4.97 | 5.73 | 5.53 |
| nC5 (mole %) | 3.88 | 4.45 | 3.79 | 4.09 | 3.38 | 3.50 | 3.31 |
| Total C4 inerts (mole %) | 4.34 | 2.96 | 4.70 | 6.70 | 9.79 | 6.71 | 6.76 |
| Total Heavies | 28.69 | 27.51 | 28.13 | 30.26 | 32.94 | 29.47 | 30.34 |
| Total | 100.00 | 100.00 | 100.00 | 100.00 | 100.00 | 100.00 | 100.00 |
| C4 Inerts/Total Condensing Inerts | 0.31 | 0.22 | 0.33 | 0.39 | 0.54 | 0.42 | 0.43 |
| Cooling System Conditions | | | | | | | |
| T, rx, inlet (C.) | 47.23 | 47.91 | 46.3 | 50.80 | 49.60 | 49.98 | 48.91 |
| T, cooler, process, out (C.) | 49.37 | 50.27 | 48.26 | 52.50 | 51.40 | 50.71 | 50.65 |
| T, phe, tempered water, in (C.) | 51.64 | 51.77 | 52.09 | 56.01 | 54.02 | 53.88 | 54.09 |
| T, phe, tempered water, out (C.) | 34.04 | 34.35 | 34.26 | 34.62 | 31.58 | 35.34 | 33.78 |
| T, tempered water, control (C.) | 37.94 | 38.51 | 39.64 | 42.58 | 38.31 | 40.51 | 39 |
| T, sea water, in (C.) | 29.50 | 29.82 | 30.67 | 30.51 | 29.46 | 30.48 | 29.62 |
| Q, tempered water, total (t/h) | 4330 | 4320 | 4357 | 4642 | 4200 | 4590 | 4141 |
| Q, seawater (t/h) | 5371 | 5269 | 5575 | 5698 | 7867 | 5578 | 5766 |

Figure 3:
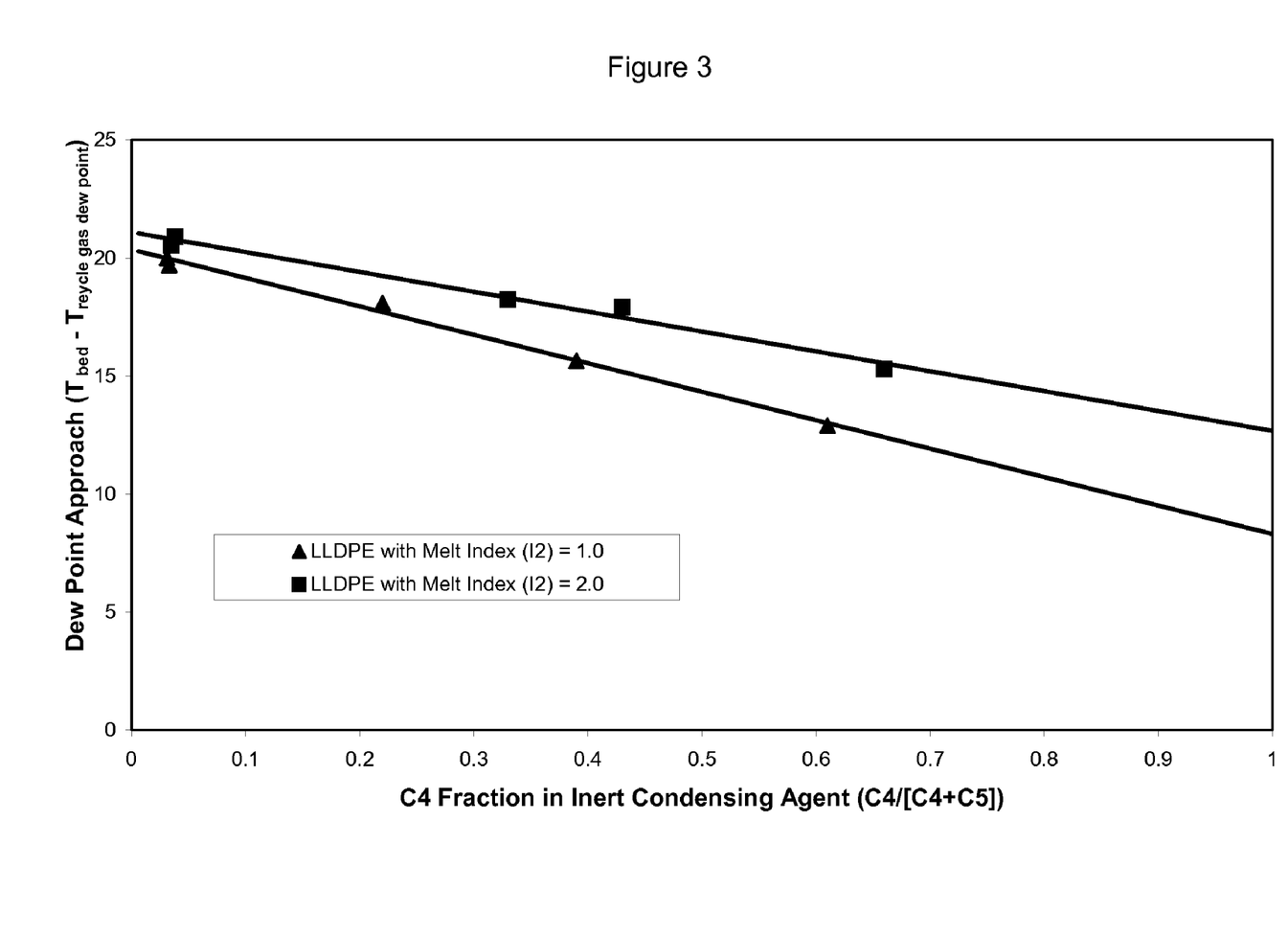
FIG. 3 is a graph showing the impact of low molecular weight dew point increasing component agent on the dew point approach temperature for commercial reactor operation at a fixed temperature (85° C.) and illustrates one embodiment of the current invention.

The examples of Table 1 show that for the same reactor bed temperature, the system operates properly as the amount of low molecular weight dew point increasing component present in the system increases and the dew point temperature increases. As the dew point temperature increases, the production capacity of the gas phase reaction system increases. Comparing Example 2 to Example 7, as the ratio of low molecular weight dew point increasing components (n-butane and isobutane mixture) to high molecular weight dew point increasing component (isopentane) increased from a ratio of about 20/70 to a ratio of about 50/50, the dew point temperature increased from 67.4° C. to about 69.0° C., the dew point approach temperature decreased by about 1.5° C., and the production rate increased by about 10.4 tonnes per hour. Clearly, the higher amount of n-butane/isobutane dew point increasing components present provides increased heat remove capacity and thus increased production capability. FIG. 3 shows a plot of the dew point approach from the data of the examples, with the dew point approach temperature extrapolated out to higher ratios of low molecular weight dew point increasing components to the total of all dew point increasing components. The data of FIG. 3 was generated from commercial operations, where the practice is not to run at the ultimate limit of fluid bed stability. The dew point approach temperatures presented in FIG. 3 are those at which first appearance of agglomerates (heavy rubble) are noted. Sustained operation can be possible at dew point approach temperatures 3 to 5 degrees closer to bed temperature. However, the data demonstrates the substantial improvement in attainable dew point approach afforded by higher ratios of low molecular weight ICA to high molecular weight ICA. The data presented in FIG. 3 relates to operation at bed temperatures of 85° C. Commercial operation at lower bed temperature has demonstrated even smaller dew point approach temperatures.

Comparing Examples 1-3 and Examples 4-7, it is obvious that it is beneficial to install an enhanced vent recovery system. This is because the nitrogen content in the gas phase reaction system must be reduced to lower levels (19-21 mole % versus 23-25 mole %) in order to "make room" in the reactor for the increased amount of dew point increasing components required when using low molecular weight dew point increasing components. To lower the nitrogen concentration, it may be necessary to take a larger vent from the gas phase reaction system.

The enhanced vent recovery system allows the recovery of the valuable comonomers and dew point increasing components from a potentially higher vent flow. This recovery allows commercially economical operation with the low molecular weight dew point increasing components. Furthermore, some operating facilities may be limited on the supply of comonomer and dew point increasing components. The recovery reduces the required feed rate of comonomer and dew point increasing components, thus allowing operation of these facilities to use low molecular weight dew point increasing components.

All documents described are fully incorporated herein by reference, including any priority documents and/or testing procedures, except to the extent they are inconsistent with this specification.

Although the present invention has been described in considerable detail with reference to certain preferred versions and examples thereof, other versions are possible. For instance, any combination of high molecular weight dew point increasing component may be used. Furthermore, the enhanced recovery system may comprise a membrane, a PSA, or any other suitable system for separating inerts or other gases from condensable hydrocarbons. Clearly, the current invention may be used in a variety of processes, including other types of polyethylene and polypropylene production. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A gas phase polymerization process comprising the steps of:
    passing a recycle stream through a fluidized bed in a gas phase fluidized bed reactor, wherein the recycle stream comprises a low molecular weight dew point increasing component and a high molecular weight dew point increasing component;
    polymerizing at least one alpha-olefin monomer in the presence of a catalyst; and
    controlling an amount of the low molecular weight dew point increasing component in the recycle stream such that a dew point approach temperature of the recycle stream is less than the dew point approach temperature when operating with the higher molecular weight dew point increasing component alone.

2. The process of claim 1, wherein the at least one alpha-olefin monomer is selected from the group consisting of ethylene, propylene, butene, hexene, octene, and mixtures thereof.

3. The process of claim 2, wherein the low molecular weight dew point increasing component is selected from the group consisting of propane, n-butane, isobutane, and mixtures thereof.

4. The process of claim 3, wherein the high molecular weight dew point increasing component comprises a $C_5$ to $C_{10}$ saturated or non-polymerizable unsaturated hydrocarbon.

5. The process of claim 4, wherein the high molecular weight dew point increasing component is selected from the group consisting of n-pentane, isopentane, neopentane, n-hexane, isohexane, n-heptane, n-octane, and mixtures thereof.

6. The process of claim 4, wherein the dew point approach temperature is less than about 20° C.

7. The process of claim 4, wherein the catalyst is selected from the group consisting of a Ziegler-Natta catalyst system; a chrome oxide catalyst system; an organochromium catalyst system; a single-site catalyst system; and mixtures thereof.

8. A gas phase polymerization process comprising:
    passing a recycle stream through a fluidized bed in a gas phase fluidized bed reactor;
    polymerizing at least one alpha-olefin monomer in the presence of a catalyst in the gas phase fluidized bed reactor at an initial production rate;
    establishing a composition of the recycle stream, wherein the recycle stream comprises a low molecular weight dew point increasing component and a high molecular weight dew point increasing component;
    determining an initial maximum allowable dew point temperature of the recycle stream; and
    increasing the amount of the low molecular weight dew point increasing component in the recycle stream, such that an actual dew point temperature of the recycle stream is greater than the initial maximum allowable dew point temperature.

9. The process of claim 8, further including the step of increasing the initial production rate in the gas phase reactor such that the actual production rate is greater than the initial production rate.

10. The process of claim 8, further comprising the step of controlling a ratio of the amount of low molecular weight dew point increasing component to the amount of high molecular weight dew point increasing component in the recycle stream.

11. The process of claim 8, wherein the low molecular weight dew point increasing component is selected from the group consisting of propane, n-butane, isobutane, and mixtures thereof.

12. The process of claim 11, wherein the high molecular weight dew point increasing component comprises a $C_5$ to $C_{10}$ saturated or non-polymerizable unsaturated hydrocarbon.

13. The process of claim 12, wherein the high molecular weight dew point increasing component is selected from the group consisting of n-pentane, isopentane, neopentane, n-hexane, isohexane, n-heptane, n-octane, and mixtures thereof.

14. The process of claim 13, wherein the actual dew point temperature is within about 20° C. of the bed temperature.

15. The process claim of 13, wherein the catalyst is selected from the group consisting of a Ziegler-Natta catalyst system; a chrome oxide catalyst system; an organochromium catalyst system; a single-site catalyst system; and mixtures thereof.

16. A gas phase polymerization process comprising:
 passing a recycle stream through a fluidized bed in a gas phase fluidized bed reactor;
 polymerizing at least one alpha-olefin monomer in the presence of a catalyst in the gas phase fluidized bed reactor;
 establishing a composition of the recycle stream at an initial production rate in the gas phase fluidized bed reactor, wherein the recycle stream comprises a low molecular weight dew point increasing component and a high molecular weight dew point increasing component;
 determining an initial maximum allowable condensing level of the recycle stream; and
 increasing the amount of the low molecular weight dew point increasing component in the recycle stream such that an actual condensing level of the recycle stream is greater than the initial maximum allowable condensing level.

17. The process of claim 16, further including the step of increasing an actual production rate in the gas phase reactor such that the actual production rate is greater than the initial production rate.

18. The process of claim 16, further comprising the step of controlling a ratio of the low molecular weight dew point increasing component to the high molecular weight dew point increasing component.

19. The process of claim 16, wherein the actual condensing level is greater than 10 wt %.

20. The process of claim 16, wherein the actual condensing level is greater than 20 wt %.

21. The process of claim 16, wherein the actual condensing level is greater than 25 wt %.

22. The process of claim 16, wherein the low molecular weight dew point increasing component is selected from the group consisting of propane, n-butane, isobutane, and mixtures thereof.

23. The process of claim 22, wherein the high molecular weight dew point increasing component comprises a $C_5$ to $C_{10}$ saturated or non-polymerizable unsaturated hydrocarbon.

24. The process of claim 23, wherein the high molecular weight dew point increasing component is selected from the group consisting of n-pentane, isopentane, neopentane, n-hexane, isohexane, n-heptane, n-octane, and mixtures thereof.

25. The process of claim 24, wherein a dew point approach temperature is less than about 20° C.

26. The process claim of 24, wherein the catalyst is selected from the group consisting of a Ziegler-Natta catalyst system; a chrome oxide catalyst system; an organochromium catalyst system; a single-site catalyst system; and mixtures thereof.

27. A gas phase polymerization process comprising the steps of:
 passing a recycle stream through a fluidized bed in a gas phase fluidized bed reactor, wherein the recycle stream comprises a low molecular weight dew point increasing component;
 polymerizing at least one alpha-olefin monomer in the presence of a catalyst;
 forming a system vent stream comprising gases from the gas phase fluidized bed reactor;
 passing the system vent stream through a recovery system, wherein a portion of the system vent stream is condensed and recovered, and wherein a non-condensed vent stream is formed;
 passing the non-condensed vent stream to an enhanced recovery system;
 separating a hydrocarbon-rich stream and a hydrocarbon-lean stream from the non-condensed vent stream in the enhanced recovery system; and
 recycling the hydrocarbon-rich stream to the recovery system to recover a condensable portion of the hydrocarbon-rich stream.

28. The process of claim 27, wherein the system vent stream comprises a reactor vent gas.

29. The process of claim 27, further comprising the steps of:
 transferring a polymer and entrained gases from the gas phase fluidized bed reactor to a purge vessel, wherein the polymer comprises a plurality of dissolved gases, and wherein the dissolved gases and the entrained gases comprise the low molecular weight increasing component;
 purging the dissolved gases and the entrained gases from the polymer in the purge vessel; and
 forming the system vent stream, wherein the system vent stream comprises the dissolved gases and the entrained gases.

30. The process of claim 29, wherein the system vent stream further comprises a reactor vent gas.

31. The process of claim 29, wherein the low molecular weight dew point increasing component is selected from the group consisting of propane, n-butane, isobutane, and mixtures thereof.

32. The process of claim 31, wherein the recycle stream further comprises a high molecular weight dew point increasing component and the high molecular weight dew point increasing component comprises a $C_5$ to $C_{10}$ saturated or non-polymerizable unsaturated hydrocarbon.

33. The process of claim 32, wherein the high molecular weight dew point increasing component is selected from the group consisting of n-pentane, isopentane, neopentane, n-hexane, isohexane, n-heptane, n-octane, and mixtures thereof.

34. The process of claim 33, wherein the low molecular weight dew point increasing component comprises n-butane and isobutane.

35. The process of claim 29, wherein the catalyst is selected from the group consisting of a Ziegler-Natta catalyst system; a chrome oxide catalyst system; an organochromium catalyst system; a single-site catalyst system; and mixtures thereof.

36. The process of claim 29, wherein the enhanced recovery system comprises a membrane unit.

37. The process of claim 29, wherein the enhanced recovery system comprises a PSA unit.

38. The process of claim 29, wherein the enhanced recovery system comprises an enhanced recovery condensing system.

39. The process of claim 38, wherein said enhanced recovery condensing system exposes the system vent stream to a temperature of less than about −30° C. and a pressure greater than about 3 Barg.

40. The process of claim 38, wherein said enhanced recovery condensing system exposes the system vent stream to a temperature of less than about −20° C. and a pressure greater than about 5 Barg.

41. The process of claim 38, wherein said enhanced recovery condensing system exposes the system vent stream to a temperature of less than about −15° C. and a pressure greater than about 6.5 Barg.

42. The process of claim 38, wherein said enhanced recovery condensing system exposes the system vent stream to a temperature of less than about −10° C. and a pressure greater than about 8 Barg.

43. The process of claim 38, wherein said enhanced recovery condensing system exposes the system vent stream to a temperature of less than about −5° C. and a pressure greater than about 10.5 Barg.

44. The process of claim 38, wherein said enhanced recovery condensing system exposes the system vent stream to a temperature of less than about 0° C. and a pressure greater than about 13 Barg.

* * * * *